Figure 1:
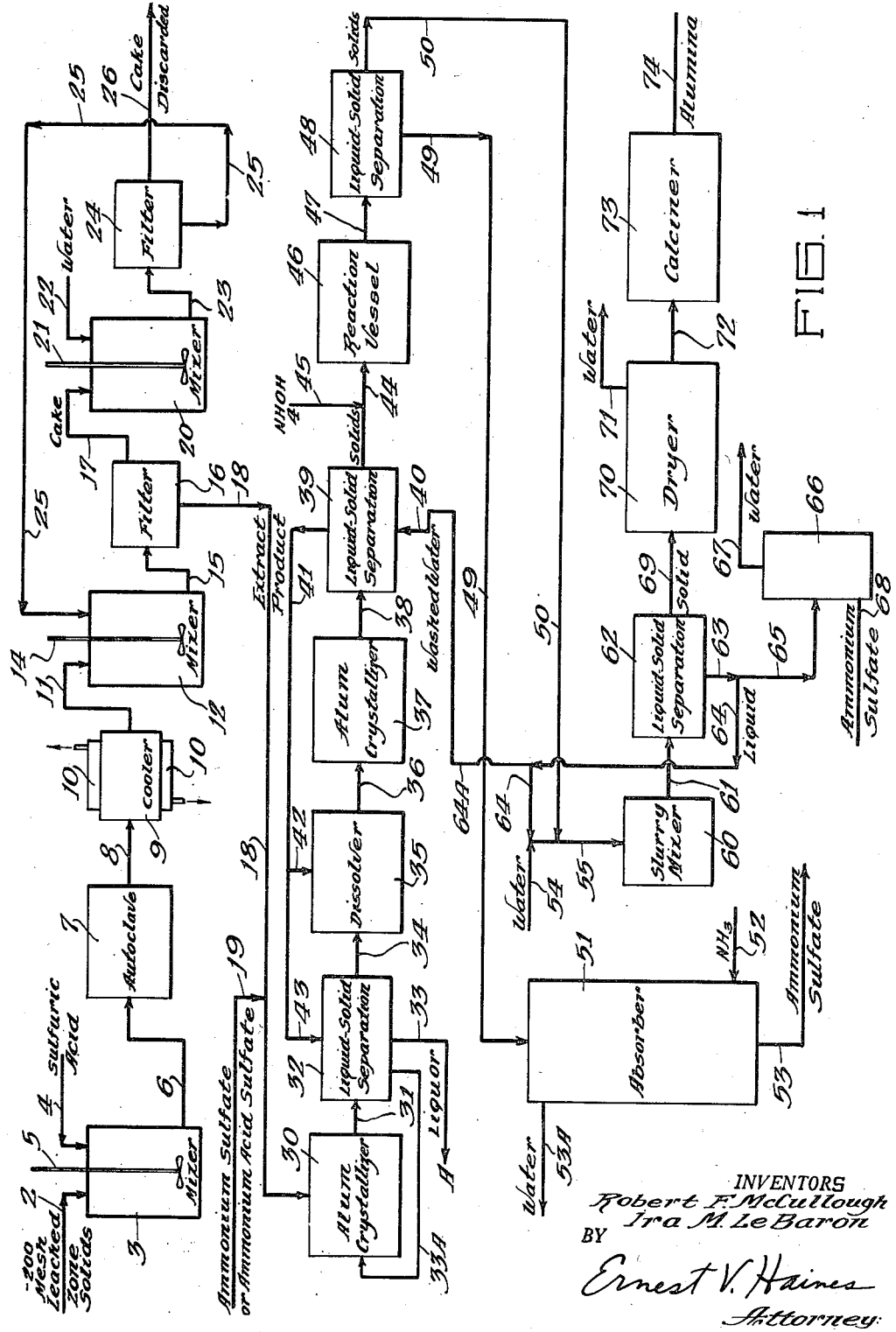

United States Patent Office 2,769,686
Patented Nov. 6, 1956

2,769,686
RECOVERY OF MINERAL VALUES FROM LEACHED ZONE MATERIAL OVERLYING FLORIDA PEBBLE PHOSPHATE DEPOSITS

Robert F. McCullough, Lakeland, Fla., and Ira M. Le Baron, Evanston, Ill., assignors, by mesne assignments, to the United States of America as represented by the United States Atomic Energy Commission Application December 8, 1952, Serial No. 324,632

13 Claims. (Cl. 23—14.5)

The process of the present invention relates to the recovery of certain mineral values found in the so-called leached zone of the overburden from the phosphate matrix found in the Florida pebble phosphate fields. More commonly, the phosphate zone of material above the phosphate matrix is known in the field as Bartow clay. A view of the cross section of the land containing this Florida pebble phosphate shows that there are at least three general layers which can be observed. The top layer, which averages from seven to twelve feet thick from the surface down, consists of humus, sand and clay. Immediately below this layer, which averages from six to eleven feet, there is a layer of material called Bartow clay or leached zone. This consists largely of a silty to clay-like sand containing components of aluminum, uranium, phosphorus and minor values, together with other clays and slimes. This particular area or layer has been found to contain as much as 0.007 to 0.3% uranium. The third layer from the surface is the pebble phosphate matrix which is the material presently mined commercially and processed to obtain phosphate rock concentrates which are sold to the chemical and fertilizer industries. At times, an overlap or transition layer intermediate the leached zone and the phosphate matrix is found. Roughly, it is a mixture of these two layers.

Strip mining removes the overburden from the phosphate matrix and in this process the two top layers are piled to one side. Once the phosphate matrix is reached it is mined then mixed with water and pumped to the washer and flotation plants for the beneficiation of phosphatic values. In the washer a pebble phosphate rock is obtained as one product. The remaining material is split at about 200 mesh and the plus 200 mesh values are used as flotation feed to the plant. From this a flotation concentrate is produced. The minus 200 mesh material is called slimes and is sent to large settling areas so that the water can be recycled, after separation from the finely divided solids, and reused in the plant operation.

The process of the present invention has to do with the treatment of the leached zone or Bartow clay, as well as the overlap or transition zone. This material is less phosphatic than the phosphate matrix and although it is not a true clay it does exhibit a porous and generally soft, pliable structure. Mineralogically, it consists of quartz, wavellite and perhaps pseudo-wavellite as the major phases. Chemically, it is considered to be a mixture of hydrated aluminum and calcium aluminum phosphates with fine quartz iron oxide, combined fluorine and some clay. Also there may be some unleached and partially leached tricalcium phosphate pebble present as well. The following analysis of the Bartow clay or leached zone material was obtained by averaging the analyses obtained from about 200 drill core samples procured over an area of about 36 square miles. The leached zone material or Bartow clay averages as follows:

| | Percent |
|---|---|
| $P_2O_5$ | 8.69 |
| $Al_2O_3$ | 8.68 |
| $CaO$ | 6.37 |
| $U_3O_8$ | 0.0144 |
| Acid insolubles | 68.72 |

Since the vast percentage of the acid insoluble material is quartz and since it has a coarser particle size than the other materials contained in the material being mined, it has been found advantageous, but not necessary to the invention, to split the ore after suitable comminution, if desired, into one fraction of small particles and another fraction of coarser particles. The entire leached zone material may be processed in accordance with the present invention. However, the solids are usually split at from about 150 up to about 220 mesh after having been slurried with water. Other mesh splits may also be used commensurate with efficient operation of the comminution equipment. The fraction containing the particles smaller than this is the valuable fraction while the fraction containing the particles larger than this is the fraction which is for the most part quartz and is discarded. The process of the present invention preferably has to do with the solubilizing and recovery of the mineral values contained in the fraction whose particles are smaller than from about minus 150 to about minus 220 mesh, preferably about minus 200 mesh. The following table shows the constituents according to their presence in, for example, the plus 200 mesh fraction and the minus 200 mesh fraction:

| Mineral value | Plus 200 mesh | Minus 200 mesh |
|---|---|---|
| | Percent | Percent |
| $P_2O_5$ | 5.44 | 14.68 |
| $Al_2O_3$ | 1.68 | 25.34 |
| $CaO$ | 5.53 | 9.19 |
| $Fe_2O_3$ | 1.60 | 3.11 |
| $U_3O_8$ | 0.0053 | 0.0299 |
| Acid insolubles | 83.08 | 38.56 |

As before stated, the following novel solubilizing process and its alternatives may be applied to the leached zone material as mined, however, it is usual to employ the novel process and its modifications only to the minus 150 mesh up to minus 220 mesh material, that is, material smaller than minus 150 mesh or smaller than minus 220 mesh, preferably material minus 200 mesh. To recover this material the leached zone material as mined is slurried with water and subjected to a series of classification operations and thickening operations in order to segregate the minus 200 mesh portion thereof. Roughly this will constitute about 25% to 35% of the original material, the coarser material constituting the remaining 65% to 75% by weight of the mined leached zone material. In discarding the plus 200 mesh fraction in the 65% to 75% by weight of the mined leached zone material, about 20% of the original uranium, about 40% of the original $P_2O_5$ and about 10% of the original $Al_2O_3$ are discarded along with a major portion of the quartz or silica found in the original mined material. The coarse particle fraction i. e., the plus 200 mesh material may be subjected to the conventional froth-flotation, tabling or spiral beneficiation operations in order to recover 60% by weight of the $P_2O_5$ material contained therein. The present invention, however, has to do with the treatment of the fine particle fraction and the recovery of the mineral values contained therein.

The thickened material of approximately minus 200 mesh and of from about 30% to about 65%, but normally about 30% solids density as it comes from the ore dressing operation, is reacted with sulfuric acid by one of three methods. The reaction of these solids will be described as (1) Wet Process Method (2) the Aging Method, and (3) the Pressure Method.

In the Wet Process Method, a 200 mesh slurried material is subjected to the reaction of sulfuric acid under such conditions of time, temperature, concentration of acid and total amount of acid used as to obtain optimum recovery of the uranium, phosphorus, aluminum or other recoverable and valuable values contained in the material, i. e., through the water solubilizing of these values by the acid treatment. The description hereinafter given will be made with reference to minus 200 mesh material, however, as heretofore stated this material could be varying from minus 150 mesh as well as any point in between 150 and 220 mesh, since the mesh size within these limits does not materially affect the operability of the process. The leached zone material without any sizing treatment may also be treated directly by any of these methods, with sulfuric acid. In the Wet Process Method a temperature as high as practical consistent with the limits of the equipment and with the economies to be effected is generally employed. This temperature ranges between about 60° and about 90° C., although temperatures outside of this range may be employed. Preferably, however, the operating temperature is about 75° C.

Preferably, the digestion is carried out for a period of time ranging between about 0.2 and about 6 hours. More specifically, between about 15 and about 60 minutes is used, although the length of time may be varied considerably depending upon the other three variations in reaction conditions as hereinbefore stated. The interdependence of these four variables makes vast differences in the specific conditions employed as to each variation. Thus, for example, the amount of time employed for the completion of the acid digestion with sulfuric acid depends, among other things, upon the percent acidulation which it is desired to obtain. In general, the higher the percent acidulation used, the lower the time required. Thus, for example, if about 86% acidulation is used i. e., through the use of about 82 pounds of sulfuric acid per 100 pounds of clay, only about 15 minutes is required to accomplish the digestion, while at about 45% acidulation i. e., about 43 pounds of sulfuric acid per 100 pounds of leached zone material requires about 6 hours to give a good recovery through the solubilizing of the desired constituents in the leached zone material. After all of the sulfuric acid has been added, the concentration contained in the mixture should be between about 20 and about 50% sulfuric acid, preferably about 30% concentration from the standpoint of attaining a high overall recovery of the desired mineral values contained in the leached zone material, while at the same time having good mixing characteristics in the slurry. In general, the higher the acid strength in the final mixture, the better the dissolution of the desired constituents in the slurry. The acid, of course, may be added as 98% sulfuric acid so that it is diluted as a result of its addition to the aqueous slurry of the leached zone material. The acid may also be added in a partially dilute state by pre-admixing it with water to a certain extent, say 70% acid, so that upon addition to the leached zone material slurry, the desired final acid concentration in the mixture is attained. The acid dilution, to some extent, is dependent upon the physical characteristics of the resulting slurry, i. e., since it is preferred to stir or otherwise agitate the reaction mass, the slurry must be sufficiently dilute to permit fluidity and the wetting of the solid particles while at the same time attaining an homogeneous mixture. In general, the amount of acid added, as before stated, is correlated to a large extent with the other reaction conditions, namely, the temperature under which the digestion and solubilizing takes place, the time of the digestion and the final total amount of acid present in the slurry. Depending upon the analysis of the particular leached zone material processed, between about 30 and about 105% acidulation is desired. This corresponds to the addition of between about 29 and about 100 pounds of sulfuric acid per 100 pounds of leached zone material processed. Preferably about 88% acidulation is used, that is, using about 84 pounds of sulfuric acid per 100 pounds of leached zone material. Economic considerations, however, may limit the total amount of sulfuric acid used to somewhat lesser amounts in order to economize on the amount of sulfuric acid used. The more acid added, of course, the higher the extraction of the uranium, phosphorus and aluminum values from the leached zone ore fraction.

The percent acidulation referred to in this description is calculated on the basis of the reaction of sulfuric acid with all of the iron, aluminum, calcium, magnesium and sodium or other significant cationic constituents present in the leached zone material. In other words, 100% acidulation would be the addition of that amount of sulfuric acid required to completely react with these components.

The second method of water solubilizing these desired mineral values with sulfuric acid is known as the so-called Aging Method. In this process the sulfuric acid is contacted in much the same manner as in the first method except that the slurry density is higher with respect to the solids content, and it is somewhat similar to the commercial process employed in the manufacture of superphosphate, through the acidulation of phosphate rock with sulfuric acid. The sulfuric acid is usually added to the slurry of minus 200 mesh leached zone material at atmospheric temperature though it may be at higher temperatures than atmospheric. During the addition an exothermic reaction takes place so that the final mixture is, because of this exothermic reaction, at a somewhat elevated temperature. The time of mixing is not particularly critical except that it should be for a sufficient length of time to enable a thorough dispersion of the acid into the solid materials or slurry. Usually between about 3 and 5 minutes will provide ample time to accomplish this result. The soupy mixture resulting from the acid addition is then removed to a curing pile where it remains for between about 20 and about 60 days, preferably for about 45 days, though the exact time is not critical. In general, however, the longer the mixed material is cured the higher the ultimate recovery of the desired constituents will be. This follows about the same principles and considerations as are employed in the manufacture of ordinary commercial superphosphate, though, since leached zone material is used, somewhat different reactions take place and a bin for the curing operation may be used, especially if the mix is too soupy to remain in a pile.

The concentration of acid employed is usually the highest possible concentration compatible with the type of equipment used and with the ability to mechanically agitate the soupy material during the acid addition step. The sulfuric acid is usually added as 40 to 65% aqueous sulfuric acid. The highest concentration of acid possible is added, bearing in mind that there must be good mechanical agitation attained and there must also be a fluid mass, that is, one having sufficient water present so as to have a final acid mixed mass of material that adapts itself to transport on an endless belt yet also adapts itself to curing in a pile or in a bin. The greater the amount of sulfuric acid employed, that is the greater the percent of acidulation, the greater the ultimate recovery of the desired constituents will be. However, for practical operating consideration and from economic consideration the amount of acidulation will vary from between about 35 and about 75%, preferably about 65%, or about 62 pounds sulfuric acid per 100 pounds of leached zone processed.

The third method of solubilizing the desired mineral values of the leached zone material by means of sulfuric acid is the Autoclave or Pressure Method. This method has been found to be the preferred method for accomplishing the recovery of the desired mineral values. The 20 to 65% solid slurry of minus 200 mesh leached zone material is placed in an autoclave and is heated under either extraneously produced pressure or autogenous pressure. Pressures ranging between about 10 and about 175 pounds per square inch or above are useable, but it is preferred to use about 160 pounds per square inch gauge. Higher and lower pressures may be employed, but the pressures in the upper portion of the range are required if the percent acidulation used is of a low order, and, of course, the lower pressures may be used if the percent acidulation is of a relatively high order. Otherwise the ultimate recoveries of the desired mineral values are considerably lower. Usually the temperature of the reaction mass is normally above atmospheric, that is, it is between about 75 and up to about 200° C., but usually the elevated temperature is only sufficient to attain the heretofore designated pressures. Temperatures outside the range of those stated and required to attain the autogenous pressures are also useful. The pressure-temperature relationship need not be correlated on the basis of the vapor pressure of the water content of the slurry being heated. The concentration of the sulfuric acid in the slurried mixture is about the same as that described in connection with the two previous methods of solubilizing the minus 200 mesh leached zone material with sulfuric acid, namely between about 20 and about 50%, preferably about 30%, that is, in the final mixture after acidulation, the concentration of sulfuric acid will be about 30% based on the dilution attained when water in the solids and acid are combined with anhydrous sulfuric acid, but assuming no reaction with the solids has taken place. The time of digestion required will range between about 0.01 and about 1.0 hour, preferably about 0.75 hour. Although the phosphorus values are consequently high in the ultimate recovery, it is necessary to use the longer times in order to attain higher uranium and aluminum recoveries. Furthermore, in order to get substantially complete conversion of the uranium values under the conditions obtaining, the percent acidulation should range between about 30 and about 90%, preferably about 80%, while also having regard to the economic considerations such as the type of equipment and its ability to withstand corrosion, the cost of the acid and the like.

Based on the above considerations with regard to the Autoclave Method, about 1,500 pounds of sulfuric acid (80% total acidulation) are required per ton of minus 200 mesh leached zone material. The mineral digest obtained shows a solubilization between about 84 and about 93% of the $U_3O_8$ present originally in the leached zone material, between about 90 and about 92% of the alumina originally present in the minus 200 mesh leached zone material and between about 86 and about 93% of the $P_2O_5$ present in the minus 200 mesh leached zone material. Additionally, this method has the added advantage that the final slurry has been found to be more easily filtered, that is, a faster filtering rate is attained than is the case with respect to slurries prepared by the two preceding methods. The release of pressure of the digested material results in a rapid cooling of the acid treated material. Although temperatures up to 200° C. may be used, the recoveries are not usually sufficiently greater when using such high temperatures as to be justified when considering the increased cost necessary to attain those high temperatures. In general, the lower temperatures with slightly longer times of digestion will be just as advantageous from the standpoint of uranium recovery as the use of high temperatures over shorter periods. Solubilizing can be carried out with agents giving a sulfate solution other than sulfuric acid.

The time of digestion required will range between about 0.1 and about 1 hour, preferably between about 15 minutes and about 45 minutes. In this superatmospheric pressure method, of course, the pressure employed will vary as will the other reaction conditions depending upon any specific set of values maintained for reaction conditions. The higher the superatmospheric pressure employed, and the higher the temperature employed, the shorter the contact time required for digestion and dissolution of the mineral values. On the other hand, the milder reaction conditions of temperature and pressure will require longer periods of reaction time. Additional ease of subsequent filtration of solids from liquid has been found in the case of leached zone material processed by the autoclave method through the expedient of flash cooling to atmospheric pressure. Also heat exchange difficulties are minimized by avoiding any substantial deposition of calcium sulfate on cooling surfaces. It has been discovered that while the aluminum and phosphorus values are generally solubilized almost entirely within the first 1 to 15 minutes of the pressure digestion, the uranium values do not appear always to be so influenced by the use of pressure, but appear to be much more completely dissolved in relation to greater time of carrying out the digestion. Accordingly, the autoclave step or treatment alternatively may be preceded by or followed by a retention step at atmospheric pressure or thereabout in order to increase the solubilizing of the uranium values with the autoclave step being conducted only from 1 to 15 minutes, i. e., only sufficiently long to solubilize the aluminum and phosphorus values. Such a procedure effects considerable savings by the reduction of the need for expensive autoclave sizes and numbers of units.

The following table shows the percentages of the various values present in the minus 200 mesh leached zone fraction which are soluble in an aqueous medium after treatment with sulfuric acid for each of the three acid treatment methods hereinbefore described. Total acidulation, for comparative purposes, is in each case 70% of the total amount of sulfuric acid required to completely react with all of the reactable components of the material treated.

| Method | Time, hrs. | Pressure, lbs. sq. in. | Temperature, ° C. | Percent solubilized | | |
|---|---|---|---|---|---|---|
| | | | | $Al_2O_3$ | $P_2O_5$ | $U_3O_8$ |
| Wet process. | 2.0 | Atmos. | 75 | 65 | 77 | 86 |
| Aging | 1 min. stirring, 56 days' curing. | Atmos. | Atmos. | 95 | 97 | 88 |
| Autoclave | 1.0 | 160 | 188 | 94 | 93 | 93 |

Reagent costs per unit, amounts of the desired values solubilized and ultimately recovered are approximately the same as between the aging and autoclave methods, while the acid consumption in the case of the wet process, for the same total amount of solubilized values as are obtained with the aging and autoclave methods, is somewhat greater.

The digested material after treatment with sulfuric acid in one of the three methods previously described herein, is then mixed with water and slurried therewith in order to take up as an aqueous solution all of the water-soluble values contained in the acidified and digested leached zone material. The taking up in water is generally done in a step-wise multistage (usually three or four) countercurrent operations involving a mixer, a filter or another liquid-solid separation means followed by a second mixer and a second liquid-solid separation means, usually a filter. The liquid, starting as water, in general goes from the last stage toward the first stage while the solids go from the first stage toward the last stage. The extract of dissolved material containing the uranium, phosphorus and aluminum values, normally at a specific gravity of 1.3, is then subjected to an alum crystallization operation, using ammonium sulfate and/or ammonium acid sulfate as the addition reagents. Before the treatment with the ammonium sulfates, the filtrate from the solids-liquid separation is adjusted to a specific gravity of about 1.3, measured under standard conditions, and the ammonium sulfate and/or ammonium acid sulfate is then dissolved in this filtrate and further subjected to a liquid-solid separation operation to separate out the alum crystals of ammonium aluminum double sulfates. Adjustment of the specific gravity of the filtrate to between about 1.25 and about 1.50 is satisfactory but a specific gravity of about 1.3, prior to alum removal, is preferred. The digestion with, or initial solution of, the ammonium sulfates is normally accomplished at temperatures around 70° C., the ammonium sulfate being added either as fresh or recycled material from another section of the process as hereinafter described, however, if purity of the alum crystallized is of secondary importance, it may be added at room temperature or lower temperature and the desired recovery of alum still attained.

Maximum yields in the crystallization of the ammonium alum depends upon proper correlations of time, temperature, specific gravity of the solution prior to ammonium sulfate and/ or ammonium acid sulfate addition, and quantity of ammonium sulfates added. It has been found that a crystallizing time of about 0.2 up to about 24 hours is satisfactory, longer times favoring the higher recovery of the alum crystals, but 2 to 4 hours is normally used in plant operation. Temperature of crystallization is important in that lower temperatures favor higher recoveries, usually about a 10% increase in alum crystallization results in cooling from 25° C. to 0° C. The range of temperatures normally preferred varies between about minus 10° C., and about plus 25° C., with 5° C. being normally used, having regard to economical selection and operation of cooling equipment and the subsequent effect on the treatment of the solution and recovery of the $Al_2O_3$ contained in the liquor in processing steps to be subsequently described. The specific gravity of the solution will normally be as hereinbefore stated about 1.3, however, increasing the specific gravity to about 1.4 gives a slight increase in recovery, but at the same time produces a somewhat more viscous solution so that crystallization is more difficult to accomplish and the separation of the crystals from the liquid becomes more difficult as well. The lower specific gravities, that is gravities substantially less than 1.3, decrease the overall $Al_2O_3$ recovery in the form of an alum. Recoveries of the $Al_2O_3$ vary between about 60% and about 95% with about 88% being a usual figure.

It has been found that the quantity of sulfate combined as $Al_2(SO_4)_3$ and $H_2SO_4$, neglecting the possibility of either sulfate or $Al_2O_3$ being combined in other than that with ammonium sulfate, should preferably approach an $Al_2O_3$ to $SO_4$ mol ratio of about 1 to 4, or at least the sulfate should be in excess of that required to combine with the $Al_2O_3$ to give aluminum sulfate. Adjustment of the solution to give the desired $Al_2O_3$ to $SO_4$ ratio is preferably made with sulfuric acid, ammonium acid sulfate, ammonium acid sulfate and ammonium sulfate mixtures or other sulfates, such as potassium sulfates, which results in the formation of a relatively insoluble alum under the crystallizing conditions described herein. The adjustment of the $Al_2O_3$ to $SO_4$ ratio, when made with sulfuric acid can be made in the digestion circuit prior to or during the crystallizing operation. However, an important modification of the leached zone digestion with sulfuric acid involves the acidulation at lower percent acidulations than 100%. If acidulating at 100%, the $Al_2O_3$ to $SO_4$ mol ratio from the leaching operation, heretofore described, would be about 1 to 3 and if a lower percent acidulation, say 60% were used, this ratio would be approximately 1 to 2 or even less. Alum crystallization from liquor containing an $Al_2O_3$ to $SO_4$ ratio of 1 to 2 would give considerably less alum recovery than a 1 to 3 ratio, the latter ratio giving less recovery than a 1 to 4 ratio under a given set of crystallizing conditions. Adjustment of the solution composition, $Al_2O_3$ to $SO_4$ mol ratio, to give less than one to one, but greater than 1 to 4, gives a slight increase in alum recovery. Use of solutions having a higher than 1 to 4 ratio, which is normally preferred, depends upon efficient and economical operation of the entire procedure as herein described. By use of lower than 100% acidulation a considerable savings in fresh sulfuric acid can be effected if ammonium acid sulfate, or ammonium acid sulfate and ammonium sulfate mixtures, are added to the liquor prior to the alum removal step. This is added on the basis that part of the sulfate content from the ammonium acid sulfate combines as heretofore described and the combined ammonia added combines as ammonium sulfate. It is quite important that the ammonium content of the solution does not significantly increase above that to give ammonium sulfate with the 1 to 4 $Al_2O_3$ to $SO_4$ ratio attained since an increase in alkalinity as $NH_3$ will decrease alum recovery under a given set of crystallizing conditions. Ammonium sulfate and/or ammonium acid sulfate is normally added such that a $(NH_4)_2SO_4$ to $Al_2O_3$ mol ratio of about 1 to 1 to about 3 to 1 results with the previously described $Al_2O_3$ to $SO_4$ ratio attained. Normally, however, it is preferred to have a $(NH_4)_2SO_4$ to $Al_2O_3$ mol ratio of about 1.8 to 1, although increasing above this ratio would give some increase in alum recovery while at the same time, if the ratio is high enough, start introducing ammonium sulfate and/or ammonium acid sulfate in the crystals. The solution composition from the leached zone digestion and leaching operations can vary considerably in the mol ratio of $Al_2O_3$ to $Fe_2O_3$ and $Al_2O_3$ to $P_2O_5$. The former, usually a mol ratio of about 10 to 1, is considered to generally effect only the purity of the crystals produced, however, the latter has a significant effect on the alum recovery under a given set of crystallizing conditions. The $Al_2O_3$ to $P_2O_5$ mol ratio in the resulting liquors has been found to vary between about 10 to 1 and about 0.6 to 1 with a mol ratio of 1.2 to 1 normally expected. Increasing the above ratio gives higher total alum recovery while decreasing the ratio decreases the $P_2O_5$ recovery. The slower the crystallization of the alum the better the exclusion of entrapped or occluded mother liquor in the crystals and hence the purer the alum produced. This purification, or slow crystallization, to get a pure product also results in less loss of uranium and $P_2O_5$ in conjunction with the alum crystals. It is normally preferred to cool the liquor for alum crystallization after solution of the ammonium sulfate and/or ammonium acid sulfate, from about 65° C. to about 35° C. at a very slow rate over several hours. Under a given set of crystallizing conditions this will give a sufficiently higher purity alum crystal. Preferably the crystallizing time between about 65° C. and about 35° C. should be gradual over about a 12 hour period. Considerably shorter times, such as one hour, or considerably longer such as 36 hours, may also be used depending upon the desire for less purity or higher purity in the alum crystals, respectively. Selection of shorter or longer crystallizing periods of time is dependent upon efficient operation of this circuit and the type of equipment used in crystallizing. Continuous or batch crystallization may be used, but the latter is preferred where crystal purity is of utmost importance. The former usually gives a somewhat more impure alum crystal unless multiple crystallizers, permitting a gradual decrease in temperature, are used.

A typical analysis of the crude alum crystals produced is as follows (on a moisture free basis):

| | Percent |
|---|---|
| $SO_4$ | 45.84 |
| $Al_2O_3$ | 10.39 |
| $NH_3$ | 3.57 |
| $P_2O_5$ | 0.82 |
| $Fe_2O_3$ | 0.16 |

Preferably the first and second crystallization, hereinafter to be described, of the ammonium alum is carried out to obtain crystals which are large enough to give crystals permitting rapid filtration, centrifuging, thickening or even rake classification. Normally, however, a pan or drum filter would be used thus permitting a wash on the same filter. Factors governing the second crystallization are similar to those in the first crystallization except that in the second crystallization the conditions are more closely allied to the pure component phase system of ammonium sulfate-ammonium sulfate-water. One main objective of the alum crystallization is to prepare a material sufficiently low in $P_2O_5$, $Fe_2O_3$ and other undesirable constituents so that the resulting crystals can be reacted further to form an aluminum hydrate, $Al_2O_3 \cdot xH_2O$, which can be converted to an aluminum material suitable for the production of aluminum metal in an efficient manner. It is normally necessary and preferred to recrystallize the alum formed in the first crystallization although, depending upon the initial concentration and method of crystallizing employed in the first crystallization, it is sometimes possible to by-pass the second crystallization. Although two crystallizations are normally used to obtain the crystal purity desired, and is preferred herein, it sometimes is advantageous to use three or more crystallizations to obtain a higher purity alum crystal and it is not intended to limit the use of the circuit employed herein to this number of crystallizations. Crystal purity desired in either of the above modifications is such that the $Al_2O_3 \cdot xH_2O$ made can be used in aluminum metal manufacture, i. e., with a high cell efficiency, metal purity and recovery. Generally, the alum crystals initially separated from the alum crystallizer are redissolved with wash water, or about a 5% to 20% solution of ammonium sulfate, normally about 15%, or with mother liquor from the second crystallization of alum and from that a second crystallization of the alum is induced and the crystals in a more highly purified form are separated by means of a liquid-solid separation step.

Preferably the crystals from the second crystallization are washed with water, or a water solution of ammonium sulfate, normally cooled, said liquor from this washing being added to the mother liquor from the second crystallization therefrom, and the combined liquor partially used in redissolving crystals from the primary crystallization while the remaining portion, between about 10% and about 90%, but preferably about 30% of the mother liquor stream, or that quantity required to prevent any significant build-up of $Fe_2O_3$, $P_2O_5$ or other impurity in the crystals produced in the subsequent recrystallization is cycled to the liquor prior to or during the first alum crystallization after partial and/or complete use to wash the crude crystals from the first crystallization. Alternatively this liquor can be evaporated to a specific gravity of about 1.3 prior to recycle as heretofore described. This liquor can likewise be added to the liquor from the primary or first crystallization with recoverable values therein being recovered in later processing and/or recycled from some subsequent processing stream. A typical analysis of the purified crystals produced by this procedure is, on a moisture free basis, as follows:

|  | Percent |
|---|---|
| $SO_4$ | 46.00 |
| $Al_2O_3$ | 10.42 |
| $NH_3$ | 3.60 |
| $P_2O_5$ | 0.00015 |
| $Fe_2O_3$ | 0.0001 |

Alternatively, the same crystallization may be accomplished with the initial crystallization temperature being above those heretofore stated but below about 60° C. In this alternative procedure, after a solid-liquid separation of the crystals at a higher temperature, say 45° C., the resulting liquors are cooled to less than 25° C. and the alum crystallized. These are recovered by solid-liquid separation and cycled so that they can be recovered at 45° C. Liquor from the 25° C. (or lower temperature if desired) crystallization is used as heretofore described. Still another modification for the recovery of $Al_2O_3$ involves the evaporation of the solution prior to ammonium sulfate addition to specific gravities above 1.4 and cooling to crystallize $Al_2(SO_4)_3$. $Al_2O_3$ recoveries by this procedure are low and after removal of the aluminum sulfate, and ammonium sulfate and/or ammonium acid sulfate is normally added to the resulting liquors to crystallize ammonium alum which is processed as heretofore described. In each of the above modifications and alternates, where an aluminum material is recovered, the resulting liquor from the separation of the solid phase is then processed to recover values in this solution, i. e., uranium, phosphorus, sulfate, ammonia, aluminum, iron, etc. It is also to be understood that any solution or solids which are otherwise prepared but similar to and within the range of the value stated herein are amenable to the processing operations stated heretofore and hereinafter. In the preferred procedure the liquor from the first alum crystallization separation step is the feed material from which the uranium, phosphorus, etc., values are ultimately recovered. This will be described in detail hereinafter.

The high purity solid alum crystals from the second crystallization step are preferably then reacted with ammonium hydroxide and/or ammonia gas in a reaction vessel to produce an aluminum hydroxide and/or aluminum hydrate material together with ammonium sulfate. The same is also accomplished with ammonium alum crystals other than those by the preferred procedure although, depending upon the source of the alum crystals, the resulting material may or may not be of the desired purity normally preferred for metallurgical grade metallic aluminum or other uses of an aluminum hydroxide, aluminum hydrate or aluminum oxide.

At least three modifications or alternative procedures may be used to react the ammonium alum and produce an aluminum oxide product. Selection of the preferred procedure is largely dependent on capitalization and operating economics. All of these procedures essentially involve the reaction of ammonium alum to produce ammonium sulfate and an aluminum hydroxide material, i. e., $$(NH_4)_2SO_4 \cdot Al_2(SO_4)_3 \cdot 24H_2O + 6NH_4OH \rightarrow$$
$$4(NH_4)_2SO_4 + Al_2O_3 \cdot xH_2O + xH_2O$$

In one procedure, solid crystals of ammonium alum, usually undried and as received, but preferably about minus 20 plus 60 mesh, from the prior solid-liquid separation are reacted at room temperature with aqueous ammonium hydroxide of such concentration that the ammonium sulfate therein made during the reaction is largely soluble in the more dilute ammonium hydroxide since ammonia is consumed in the reaction. Ammonium sulfate is substantially insoluble in ammonia concentrations above 32% $NH_3$ and increasingly more soluble as the concentration of free ammonia is decreased below 32%. The above reaction is normally carried out in a closed vessel to prevent ammonia losses and is accomplished with very gentle agitation in a cocurrent system, although a concurrent system may be used. This can be carried out in either batch or continuous equipment although the latter is normally preferred, in which case the reaction vessels are in series and the underflow passed from the first to the second to the third, etc. Normally, the reaction is carried out at room temperature although temperatures above or below this permit an operable system. The reaction is retained in the reaction vessel for a period of between about 15 minutes and about 24 hours; preferably between about one and about two hours is used. The ammonia added is added in excess of that required to produce the above reaction and to the extent that substantially all of the ammonium sulfate is soluble in the ammonia solution upon substantial completion of the above stated reaction. As excess ammonia, over and above that required for the above reaction, is added the initial ammonia concentration must be decreased somewhat in order to obtain the same quantity of ammonium sulfate soluble in solution per unit of ammonium alum initially used. Normally between about 5% and about 29% ammonium hydroxide, but preferably about 20%, is added with the total ammonia content being between about 1.5 times and about 3 times, preferably about 2 times, that required for the above stated reaction. Addition of the theoretical ammonia required to carry out this reaction, at 20% $NH_3$ concentration, and 2 times the stochiometric ammonia, accomplishes the desired $Al_2O_3$ conversion in 30 minutes. Reactions carried out in the preferred manner have given materials which filter and settle extremely fast. The solids separated contain about 60% to 70% free moisture.

The above produced slurry is then preferably settled and the underflow filtered but the underflow, or the entire stream for that matter, may be processed by other solid-liquid separation equipment such as centrifuges, cyclone separators and the like. Solids therefrom are slurried with water or mother liquor comprising essentially a more dilute solution, or unsaturated solution, of ammonium sulfate and filtered to extract any water soluble values present, such as ammonium sulfate. Preferably the leaching of the ammonia and sulfate values from the aluminum hydrate is carried out at room temperature. Higher temperature such as 60° C. may be used, actually giving a slightly better extraction per stage, but the higher operating cost are not normally offset by the gains. Normally this is carried out in countercurrent extraction equipment, with filters, centrifuges and cyclone separators with usually about two or more stages being used. The solids move countercurrently with the water and/or unsaturated ammonium sulfate solutions. Liquor therefrom is processed separately or sent to other points in the system where ammonium sulfate and—or ammonium sulfate-ammonia solutions or slurries are being processed for recovery of ammonia and/or ammonium sulfate. Likewise a portion or all of this liquor may be cycled to wash or dissolve alum crystals, as heretofore described, after removal of the contained ammonia.

Liquid resulting from the aluminum hydrate circuit is partially cycled for subsequent reaction with fresh ammonium alum after passage through an ammonia absorber to build up the ammonia to the initial concentration of about 20% for use in the reaction. Since about 24 mols of water per mol of ammonium alum, and free moisture from the initial alum, are added to the stream, neglecting moisture taken out of the circuit when the $Al_2O_3 \cdot xH_2O$ product is filtered, a portion of the stream going to the ammonia absorber is removed and evaporated to keep the circuit balanced in respect to its water content. Ammonia from the evaporation is returned to the absorber for reabsorption and the liquor, after removal of the required amount of water and ammonium sulfate, is cooled and recycled to the circuit prior to or after ammonia absorption. Absorption equipment must be provided for recovering ammonium sulfate since some is crystallized at this point. Alternatively, the liquors from the solid-liquid separation of $Al_2O_3 \cdot xH_2O$ may be processed separately or in another portion of the circuit to be described later where ammonia and ammonium sulfate are being recovered and in such a case fresh aqueous ammonia is used to react with the initial alum crystals.

The second modification of the above procedure is similar to that described in the first case except that ammonia concentrations above about 32% ammonia, in the final liquor, after reaction of the ammonium alum with ammonia, are obtained and substantially all of the ammonium sulfate is insoluble in this liquor. Ammonium sulfate present in the $Al_2O_3 \cdot xH_2O$ is then extracted as previously stated and liquor, largely ammonium hydroxide, is sent to an absorber to absorb the ammonia. Normally a 45% ammonia solution is initially used although somewhat higher and lower concentrations may be used if the resulting liquor, after reaction, is above 32%. This of course is a function of the stoichiometric excess of ammonia used.

Still another, or third, modification involves heating the ammonium alum until dissolved or molten (about 90° C.), bubbling gaseous ammonia into the reaction mass in the amount required to substantially completely form ammonium sulfate and drying the resulting slurry at about 110° C. to remove all or nearly all of the water combined chemically with the alum, before reaction. The resulting dried product is extracted with water to separate ammonium sulfate from the water insoluble $Al_2O_3 \cdot xH_2O$ and filtered. The ammonium sulfate filtrate is evaporated for ammonium sulfate recovery and the $Al_2O_3 \cdot xH_2O$ processed as hereinafter described.

Aluminum hydroxide, $Al_2O_3 \cdot xH_2O$, made by any one of the above modifications and after removal of soluble values, such as ammonium sulfate, is then collected as a cake and dried to produce aluminum hydroxide, mono and/or tri hydrate, and/or aluminum oxide depending upon the ultimate use. Should an impure alumina be produced in the aforesaid modifications, the material would be dried at low temperatures, about 200° C., in conventional rotary drying or other equipment and then further purified by conventional treatment in the modified Bayer procedures. Normally, however, the $Al_2O_3 \cdot xH_2O$ product heretofore prepared will be of sufficient purity that it can be made directly into metallurgical grade aluminum. Preferably, therefore, the above aluminum hydroxide is partially or completely dried to volatize free and/or chemically combined water. Following the drying operation, the material will be calcined to produce metallurgical grade alumina at about 900° C. The calciner product is then normally cooled and stored for shipment. This product is usually of a finer particle size than the more granular material now used in the electrolytic procedure for making aluminum and may be granulated by conventional procedures to produce a material more easily handled in the electrolytic production of aluminum. The aforesaid drying and/or calcining operations are preferably carried out in the same piece of equipment. This, of course, does not preclude the use of alternate equipment which is normally applicable for driving at the temperature stated above. Likewise, it is to be understood that temperatures other than 800° C. can be used, i. e., 600° C. or 1000° C.

The liquor obtained after the separation of the initial crystals from the first alum crystallizer and/or modifications thereof contains the majority of the phosphorus, uranium, and iron values. In addition to these are ammonium sulfate and/or ammonium acid sulfate and $Al_2O_3$ values, quantities depending upon the initial conditions of alum crystallization. This liquor is first subjected to uranium recovery by use of solvent extraction as the preferred modification. Other alternative procedures, which may be used, are ion exchange treatment, differential precipitation or precipitation by specific precipitate. In the preferred procedure, solvent extraction, the solution containing the uranium dissolved therein is preferably first subjected to a reduction reaction. This may be accomplished by electrolytic means or by chemical reaction wherein the solution is treated with metallic iron, aluminum or other free metals or other reducing agents capable of reducing the solution but not substantially introducing metallic ions detrimental to specifications of final products, said metals usually being added in solid form. This is believed to partially, if not completely, reduce the uranium from a hexavalent state to a quadrivalent state. If the addition agent is in powdered form the slurry, after several minutes is subjected to a liquid-solid separation to remove the unreacted and insoluble metal therefrom. This may be accomplished through the use of a filter, centrifuge, cyclone or other suitable separation device. Preferably powdered iron is used as the reducing agent; however, commensurate with good economics and efficient operation of the uranium extraction procedure, aluminum may be used. In this connection, the aluminum could be used prior to the alum crystallization so that any dissolved aluminum would be recovered directly in the alum circuit and the reduced liquor then be subjected to the solvent extraction procedure which will herein be described. Reducing the solution prior to alum removal also is beneficial in that iron in the ferrous state while present in the alum crystallization gives alum of higher purity in respect to this component when compared with ferric ion being present. Alternately, the same procedure, to be herein described, for the solvent extraction of uranium, may be employed when the solution after alum removal is unreduced, or only partially reduced. The major difference between the reduced and unreduced solution, however, is in respect to the solvent extraction of uranium in that the reduced solution will require less theoretical extraction stages than the reduced solution. Reduction of the solution serves to reduce the uranium from a hexavalent state to a quadrivalent state or to aid in more rapidly shifting the uranium equilibrium from the hexavalent state to a quadrivalent state, while being contacted with the organic materials, since the latter is normally extracted. Between about 0.1 gram and about 8 grams of powdered iron, preferably about 2 grams, are added to the solution resulting from the alum crystallization. The slurry, after several minutes agitation, is subjected to a liquid-solid separation to remove the unreacted and insoluble metal therefrom. This may be accomplished through the use of a filter, centrifuge, cyclone or other suitable separation device. The reduced aqueous phase is then intimately contacted, stirred or otherwise agitated with the organic solvent phase. This solvent phase is made up of two components, the extractant and the vehicle or extender. The extractant may be one or more of the ortho and/or pyrophosphoric acid esters of the alkyl monohydric alcohols. Both the mono and di esters, as well as mixtures of the two are useful. The butyl, amyl, hexyl, heptyl, n-octyl, iso octyl, etc., esters with the phosphoric acids are satisfactory for the purpose, but it is preferred to use the mono and/or di esters of either octyl or hexyl alcohol with orthophosphoric acid since these are less water-soluble because its use minimizes any possibility of precipitation of phosphate compounds at the aqueous-organic liquid interface. Of course, it is to be understood that other extractants, which are relatively immiscible with the aqueous phase and having uranium removal characteristics are likewise satisfactory. The extender or vehicle may be any one or more of the common organic solvents such as kerosene, benzene, naphtha, mineral spirits, carbon tetrachloride, beta, beta dichlordiethyl ether, trichlorethylene, toluene, xylenes, and the like. Extenders such as these are limited only in that they must be miscible or partially miscible with the extractant used and substantially immiscible with the aqueous phase. Since the esters or extractants have a limited solubility in water, before recycling to the uranium extraction system, the aqueous medium is normally scrubbed with any suitable solvent such as kerosene or trichlorethylene to reduce the ester content which would be lost in subsequent processing.

The concentration of the extractant in the extender or vehicle may vary widely, for example between about 0.2 and about 100.0% preferably between about 5 and about 10%. The volume ratios of aqueous phase to organic phase also may vary within wide limits, for example between about 1 to 1 and about 40 to 1, preferably between about 5 to 1 and about 20 to 1. It is preferred to contact the organic phase with the aqueous phase under conditions near that which the latter emerges from the countercurrent leaching circuit, i. e., usually at a temperature of between about room temperature and about 60° C., preferably about 50° C. After agitation of the two phases for about one minute or less, although longer times may be used, the aqueous phase is withdrawn from the bottom and the organic phase is withdrawn from the top of a mixer extraction column. A continuous extraction is usually carried out in commercial operation in a multi-stage countercurrent extractor (using about 6 stages). This is preferred for efficient performance since, by using such a system, the organic phase will take up about 98% of the uranium values originally present in the aqueous phase. A single stage of extraction using normal octyl phosphoric acid ester has resulted in an extraction of about 95% of the uranium values present in the aqueous phase. Substantially complete reduction, 10% of extractant extended in kerosene and a 10 to 1 volume ratio of aqueous phase to organic phase was employed in that instance. Contact time, within the range of the equipment used has not been found to be a critical factor.

The organic phase is treated with aqueous hydrofluoric acid or any other mixture capable of precipitating and/or removing the $U_3O_8$ from the organic phase as a fluoride, in about 5 molar excess over that required to produce $UF_4$. This precipitated material, together with its accompanying aqueous phase, is separated from the organic phase and the solid containing $UF_4$ is recovered by filtering, centrifuging, or the like, washed and dried. The organic solvent from which the uranium values have been removed is heated to about 60° C. for about 15 minutes to evolve hydrofluoric acid which is recovered and reused and the organic phase reduced in HF concentration, is recycled for further extraction use in the process. Alternately, whether or not the hydrofluoric acid is evolved prior to recycle of the organic phase, and in order to maintain the extraction efficiency of the extractant, the organic phase is treated with solid phosphorus pentoxide and washed with 60% orthophosphoric, sulfuric or other mineral acid prior to recycling it to the extraction columns. Alternatively, the uranium fluoride product may be reacted with sulfuric acid, diluted to give about 40% acid strength, the resulting slurry heated to volatilize HF for absorption and reuse, and the evaporated liquor cooled to crystallize uranyl sulfate, after which the crystals are separated and removed from the solution, washed and dried.

Alternatively, the aqueous phase, after alum removal, containing about 8% $P_2O_5$ is fed through two or more beds in series of an intermediate base-type anion exchange resin, for example, Permutit A–300, at the rate of 0.5 to about 2 gallons per sq. ft. per minute. The first portion of the effluent from the second or last resin bed is mostly displaced water and chloride and is discarded. The uranium because of the previous treatment is believed to be in the hexavalent state and is present as an anion uranyl-phosphate complex having the probable formula $UO_2(H_2PO_4)\bar{x}$. As the extract solution is contacted with the resin the anion resin sorbs the uranyl complex in exchange for the chloride ion which is liberated. As the first bed of resin becomes fully sorbed with uranyl complex it is taken off stream and the second bed then becomes the bed first contacting the fresh extract solution. A new bed is placed last in the series of beds at the same time and in a step-wise series of operations moves toward becoming eventually the initial bed contacting the fresh extract solution, etc.

The saturated bed is desorbed or eluted of its uranyl complex by treatment with between about 1 and about 10% aqueous hydrochloric acid at the rate of between about 1 and about 5 gallons per sq. ft. per minute. Mixtures of aqueous hydrochloric acid and sodium chloride, or other alkali metal chloride, may be used in place of hydrochloric acid alone. The eluate is collected as three consecutive substantially equal portions (though the volume of these proportions may vary considerably depending upon the character of the resin, the raw material treated and the nature of the eluate produced). The first portion, which is quite high in $P_2O_5$ content is very low in uranyl content and is therefore combined with the effluent previously produced from the uranyl complex sorption step.

The second portion, which is rich in uranyl complex, is adjusted to a pH between about 1 and about 7, preferably between about 1.5 and about 2.5, by the use of a base such as calcium carbonate, calcium oxide or calcium hydroxide, or the like, to precipitate some of the phosphate values therefrom. After separation of the solids from the liquid of the second portion of the uranyl complex in the filtrate is subjected to the action of a reducing agent such as zinc, iron, sodium hydrosulfite or other suitable reducing agents, in order to reduce the uranium content to the quadrivalent state and the precipitate containing the uranium values is filtered from the solution. Additionally, and as a modification of the above procedure, the uranyl complex solution without a reducing step but after separation of the precipitated phosphate values may be reduced to give uranium a quadrivalent state and then precipitated using aqueous hydrofluoric acid from which the precipitate containing the uranium values is separated by any suitable solid-liquid separation step.

The third of the three consecutive eluate portions contains a small, but significant amount, of uranium values and because its hydrochloric acid concentration is as high as the first eluant, i. e., the eluting agent, this eluate portion is generally used as the initial eluant for eluting a subsequent bed of sorbed or loaded resin.

The determination of the change point for segregating one portion of eluate from the succeeding portion of eluate is largely one of determining the composition of the eluate and its changes in make-up with respect to time, while maintaining a constant rate of flow of eluant through the loaded resin bed. Thus, for example, the initial eluate is high in $P_2O_5$ values and practically free of other sorbed values. If eluant is fed at about 2 gallons per sq. ft. per minute, and the loaded resin column is about 4" in diameter and about 44" high, the first portion of eluate which is high in $P_2O_5$ values is cut off after about 25 minutes and the second portion of eluate is separately collected from that time on for an additional 25 minutes. This second portion is high in uranium values. The third portion of eluate is then separately collected for an additional 25 minutes and contains the residual eluted uranium values, as well as free hydrochloric acid. This portion is recycled as eluate in the succeeding loaded column to be eluted. The anion resin bed is simultaneously regenerated through the addition of the hydrochloric acid as the eluant and this process of regeneration is complete upon collecting the third successive portion of the eluate. The Permutit A–300 resin is eluted by using, preferably, about 4% hydrochloric acid alone, but it may also be eluted using a sodium chloride solution containing a major amount of hydrochloric acid and a minor amount of sodium chloride. The strongly basic resins, which are likewise useful in this process in place of Permutit A–300, such as Amberlite IRA–400, Dowex–1 and Permutit SE, and which are made according to D'Alelio process, U. S. Patent No. 2,366,007, can be eluted and regenerated with about 4% sodium chloride solution containing between about 1 and about 10% of hydrochloric acid, but are best eluted with the combination of from .5 to 1 molar sodium nitrate plus 0.1 to 0.5 molar nitric acid.

The Permutit A–300 resin is disclosed, as to its process of manufacture and composition, in U. S. Patent No. 2,469,683 issued to Dudley and Lundberg, and U. S. Patent No. 2,469,682 issued to Lundberg and Dudley. The Permutit SE anion exchange resin is an aminated cross-link polystyrene disclosed in U. S. Patent No. 2,366,007 issued to D'Alelio. Similarly, the other anion exchange resins which exhibit strong basic action, namely, Amberlite IRA–400 and Dowex–1, are cross-linked polystyrene reacted with various polyamines and suitable quaternary ammonium bases. Any anion exchange resin falling in the category of a strong base or an intermediate base, which is stable to mineral digest solutions and to the regenerating acids employed, is suitable for use in the removal of uranium values.

The recovery of uranium from the ion exchange eluates is effected by reducing the uranyl ion to the uranous ion and precipitating as the uranous phosphate or preferably as the $UF_4$ with the addition of hydrofluoric acid (48%). The reduction and precipitation can be effected by the use of reducing agents preferably as sodium hydrosulfite or as sodium sulfoxylate formaldehyde and zinc or mixtures of zinc and sodium hydrosulfite and zinc and sodium sulfoxylate formaldehyde. The reduction and precipitation can also be accomplished electrolytically. If an ion exchange membrane is used to separate the cathode and anode compartments and the eluate is run into the cathode compartment with a neutral salt solution in the anode compartment the application of D. C. current will reduce the uranium which will precipitate as uranous phosphate. At the same time the ion exchange membrane will conduct ions (cations if the membrane is a cation exchange membrane, anions if the membrane is an anion exchange membrane) so that the resulting solution in the anode compartment will be an acid-salt solution which will be used as an eluant to elute the loaded resin column. The resulting solution in the cathode will be a neutral salt solution which, after filtration of the uranous phosphate, will be used in the anode compartment during the recovery of uranium from the next eluate.

Still another procedure for recovering uranium is to neutralize the solution after alum removal with oxygen-containing basic alkaline earth metal compounds, or preferably, with ammonium hydroxide to precipitate, at a pH of between about 2.5 and about 11, normally about 7, insoluble phosphates, such as aluminum and iron phosphate, and uranium originally contained in the solution. After precipitation, either step-wise or in a single step precipitation, and separation of the solids from the liquids contained therein, the solids may be slurried with water and/or acids and bases and subjected to an extraction with organic material the same as, or similar to, those as heretofore described for extracting uranium, in either a slurry or liquid state depending upon whether the precipitate has been resolubilized. Likewise if this precipitate is substantially solubilized, i. e., wth ammonium acid sulfate, sulfuric acid, or $SO_2$, the resulting solution may be subjected to an ion exchange treatment for removal of uranium as heretofore described.

Following the removal of the uranium by the preferred procedure heretofore described the resulting liquor, containing phosphorus, aluminum, iron, nitrogen, sulfur, uranium (if present) or other values, which are combined in solution in any number of combinations, such as ammonium sulfate, ammonium acid sulfate, sulfuric acid, aluminum sulfate, iron sulfate and the $P_2O_5$ values, such as phosphoric acid or combined with the metal or cation values as mentioned before, is neutralized with oxygen-containing basic alkaline earth metal compounds, or preferably, with ammonium hydroxide and/or ammonia gas, or others which form substantially water-soluble sulfates, to decrease the acidity of said solution and to give a precipitation of the insoluble values present, i. e., aluminum phosphate, iron phosphate, probably combined to give material such as tarankite, berlinite, and others of this series, and uranium values should any be present. It has been found that somewhat selective precipitation of the aluminum, iron and uranium values can be effected if step-wise precipitation is employed. This step-wise precipitation normally, if the solution has not been previously reduced with materials such as iron, would be accomplished by neutralizing the solution to a pH of about 3.5, separating the solids therein produced and then further neutralizing the solution to a pH of about 7.0 with the formation of a second precipitate.

Under these conditions of the first precipitation, temperature, time and solution concentration have substantially no effect on the percent of original values which precipitate, substantially all of the aluminum and a smaller percentage of the iron values are precipitated. The second precipitation, pH 3.5 to 7 or higher, results in substantially complete removal of the remaining aluminum, iron and uranium values, said precipitate normally containing larger quantities of the iron and considerably smaller quantities of the aluminum and uranium values originally contained in the solution. After removal of the solids formed and upon further washing and/or processing, these precipitates may be treated in separate circuits, or in the case of the high aluminum-low iron precipitate, recycled to the liquor prior to alum crystallization for recovery of values therein contained by the procedure heretofore described. The exact conditions required to give a somewhat complete separation of the aluminum and iron values is dependent on the oxidization state of the liquor processed. For example, if liquor made by digesting leached zone solids with sulfuric acid is subjected to an alum crystallization and then, with no reduction of the solution, from the first alum circuit with iron or other materials, neutralized with ammonium hydroxide the iron will precipitate as heretofore described. However, if synthetic solutions are made, with ferric sulfate, aluminum sulfate, phosphoric acid, etc., and neutralized, the rich iron precipitate is removed as the first fraction. It has been found that the precipitates formed from the aforesaid solution by adjustment of its pH with ammonium hydroxide, between a pH of about 2.5 and about 9.0, are quite gelatinous and, although they have been found to normally filter with ease, the cake resulting contains a large quantity of entrained liquor and due to its voluminous nature requires a considerable quantity of wash solutions to remove their water-soluble entrained values. It has been discovered that if the original solution, after alum removal, is neutralized with ammonium hydroxide to pH values above about 9, preferably about 10.5, the resulting slurry becomes considerably more fluid, less voluminous and filters, or preferably centrifuges, with greater ease than those precipitates from lower pH adjustments. Upon removal of the aluminum and iron precipitate formed, the liquor resulting, depending upon the $P_2O_5$ and ammonia concentration, may be processed to recover ammonium phosphate values. It is preferred to evaporate the solution prior to ammonia addition, or after ammonia addition and before a pH of about 5.5 is reached, to a $P_2O_5$ concentration which will permit the direct removal of tri-ammonium or other ammonium phosphates from the liquor after further neutralization of the solution with ammonia and removal of the aluminum and iron phosphates from the pH 11.5 precipitation. Normally between about 0.1 and about 0.6, preferably about 0.4, of the original volume of liquor is removed by evaporation. Evaporation is conducted before about a pH of 5.5 to prevent ammonia losses in this operation. Since the temperature of the solution or slurry is raised when ammonia and/or ammonium hydroxide are added, it is normally preferred to maintain the slurry temperature, after evaporation, above 50° C. through the solid-liquid separation so that upon removal of insolubles and cooling of the solution, tri-ammonium or other ammonium phosphates are directly crystallized to give substantially complete removal of the $P_2O_5$ values with only traces of ammonium sulfate in the precipitate. Preferably, therefore, the solution after uranium extraction and recovery as heretofore described, is evaporated in conventional evaporation equipment such as submerged combustion, multiple effect evaporators and the like, to about 0.6 of its original volume and cooled, with equipment such as tubular heat exchangers or flash evaporators, to between about 30° C. and about 70° C., preferably the lowest temperature practical and commensurate with efficient ammonia absorption at higher pH values. Preferably, the evaporated solution is cooled to about 50° C. and continuously added to liquor in gas tight absorption-type reaction tanks with mixers while constantly mixing and adding ammonia to maintain a pH of approximately 7 and cooling with tubular exchangers to maintain a temperature of about 60° C. This is normally accomplished with two or more tanks in series and a slurry continuously removed to another tank or series of tanks for additional adsorption of ammonia to the higher pH required to decrease the fluidity, etc. Slurry from the latter series of reactors is centrifuged, normaly in a two, or more, stage countercurrent circuit, with water, ammonium hydroxide or, preferably, a portion of the liquor cycled after subsequent crystallization and separation of the ammonium phosphate, said liquor containing essentially ammonium hydroxide, ammonium sulfate and a small amount of ammonium phosphate. Liquor and solids resulting from the solid-liquid separation are processed separately.

Alternatively, to the above procedure described for crystallizing ammonium phosphate, the liquor after removal of the ammonium alum, is adjusted to a pH of between about 5.5 and about 7.0, subjected to a solid-liquid separation for removal of the precipitated values, and the resulting solution evaporated and crystallized at about 80° C. These crystals of ammonium sulfate are removed normally by centrifuging and the resulting liquor cooled to some lower temperature, normally about 30° C., to remove ammonium phosphate mixed with ammonium sulfate impurity, said ammonium phosphate normally comprising a mixture of mono and di ammonium phosphate. After removal of these solids, normally with filters, the end liquor is cycled to solution prior to evaporation of the pH 7 liquor. The ammonium sulfate and the ammonium phosphate-ammonium sulfate product may be purified by subsequent crystallization and/or dried as will hereinafter be described.

Liquor containing ammonium hydroxide, ammonium sulfate and smaller amounts of ammonium phosphate, from the preferred modification, at about pH 10.5 and after substantial removal of the ammonium phosphate, is preferably partially recycled to wash aluminum and iron phosphate materials previously precipitated and the remaining portion evaporated in conventional equipment and by conventional procedures for ammonia and ammonium sulfate recoveries. Alternatively, a portion of the liquor, prior to the above evaporation and ammonia and ammonium sulfate recovery, may be cycled to partially adjust the pH of the liquor after uranium removal and precipitate aluminum and iron phosphates and/or for the neutralization of the liquor from pH 7 to 10.5. The quantity of this liquor recycled would be that quantity which will permit a relatively pure ammonium phosphate to be produced, i. e., such that there is no substantial build-up of ammonium sulfate in the circuit which would, therefore, crystallize with the ammonium phosphate. The above mentioned liquor, after removal of ammonium phosphate, preferably is processed in a separate circuit, although it may be combined with all other such materials, such as ammonia and ammonium sulfate liquor from the alumina circuit, and evaporated in multiple effect evaporators or the like, which are in circuit with a crystallizer and centrifuge, or filters, such that liquor resulting is cycled for more evaporation and the ammonium sulfate removed for subsequent processing and/or recycle to the alum crystallizing operation. Ammonia present in the steam and/or condensate from the multiple effect evaporators is recovered in conventional strippers and absorbers. If complete removal of $P_2O_5$ has not been effected in that portion of the circuit, as triammonium phosphate, it is necessary to bleed and return a portion of the liquor, after removal of ammonium sulfate, to the $P_2O_5$ circuit such that any values present may be crystallized as triammonium, or other ammonium phosphates.

The aluminum and iron phosphates precipitated and removed at about pH 3.5 to about 10.5, but preferably at about a pH of about 10.5, as heretofore described, may be dried to remove water and ammonia therein contained and used as an agricultural feed material, normally as about a 39% $P_2O_5$ material. Preferably, however, the aluminum and iron materials are treated and cycled to heretofore mentioned stages after removal of sufficient iron to prevent the same from interfering or substantially decreasing the purity of the alumina products. This may be accomplished by several procedures, the preferred being a digestion of this material in an alkaline circuit to solubilize the aluminum and phosphorus values therein contained, but not substantially solubilizing the iron values therein contained, preferably with sodium hydroxide. The aluminum and iron phosphates normally contain about 13% $Al_2O_3$, 24% $Fe_2O_3$, 39% $P_2O_5$ and about 77% moisture. The exact assay of these constituents will, of course, vary considerably with the starting materials used as well as the quantity of iron used to reduce in the solution prior to uranium removal and the $Al_2O_3$ recovery obtained in the primary alum crystallization. This material requires about 30 pounds of sodium hydroxide per 100 pounds of solids after drying at 110° C. Digestion is preferably carried out between about 40° C. and about 90° C., preferably about 60° C., and one-half hour digestion time at atmospheric pressure, with stirring, is sufficient. The resulting slurry is then preferably settled or thickened and the underflow therefrom filtered or centrifuged to remove the iron hydroxides and/or other insolubles not reacted. By the above digestion procedure, substantially complete dissolution of aluminum and phosphorus values is effected. The overflow from the above thickening operation together with the filtrate from the filtering or centrifuging operation is then evaporated and cooled to crystallize tri-sodium phosphate in the conventional manner. These crystals are normally removed by filtration and the filtrate therefrom carbonated with carbon dioxide to precipitate aluminum hydroxide and aluminum phosphate materials. Upon removal of the aluminum phosphate, normally with filters, the sodium carbonate and/or sodium bicarbonate liquor is regenerated to sodium hydroxide for subsequent recycle and use by means of calcium hydroxide and a conventional procedure as is normally used in regenerating caustic solutions with recycles of carbon dioxide, lime and calcium carbonate. A two-stage lime treatment may be used to prevent a build-up of sulfate in the caustic circuit. The above circuit is operated such that an 8% caustic solution is preferably used in the digestion of the initial aluminum and iron phosphates. The iron product produced from the above is comprised essentially of ferric hydroxide mixed with very small amounts of aluminum and phosphate values. The tri-sodium phosphate from above may be treated with lime to produce a calcium phosphate and a recycle of caustic to the aforesaid circuit. Preferably, however, it is dried and marketed as such. The aluminum hydroxide and/or aluminum phosphate recovered from the above carbonation is cycled and dissolved in the liquor before alum removal for subsequent recovery of the values therein contained. Alternatively, the aforesaid aluminum and iron phosphate may be treated with sulfuric acid, ammonium acid sulfate or other acidic compounds, to resolubilize values therein contained and removal of the iron from the above material may be accomplished by a partial resolubilization which would be the reverse of the two-stage precipitation of the liquor after alum removal as heretofore described. In this connection, it is preferred to oxidize the solution with a material such as air to assure the substantial existence of ferric ions. In this operation the sulfuric acid or aluminum acid sulfate is added to give a maximum solubilization of $P_2O_5$ and $Al_2O_3$ with a minimum amount of iron so that the resulting liquor may be cycled, after solid-liquid separation, to the primary alum crystallization. The resulting solids, comprised essentially of iron phosphates mixed with aluminum phosphate, may be processed as heretofore described in the caustic circuit.

Tri-ammonium phosphate heretofore recovered by the preferred modification preferably is dried with indirect fired dryers to volatilize the water and a portion of the ammonia which is present. Gases removed from this operation are cooled and the ammonia recovered therefrom by using the conventional ammonia absorption and stripping equipment and operations. The product resulting is comprised essentially of mono-ammonium ortho phosphate if drying temperatures of less than about 150° C. are used. Drying at temperatures above these will volatilize larger quantities of the ammonia therein contained, such that the mol ratio of $NH_3$ to $P_2O_5$ is lowered below that of mono-ammonium phosphate, but will convert larger quantities of pyro and meta phosphates, the quantities of these produced increasing with an increase of temperature. Drying above about 150° C. results in the formation of a molten or liquid material which is difficult to handle in conventional drying equipment, therefore, preferably less than 150° C. is used. Alternatively, the tri-ammonium phosphate may be slurried with water or ammonium phosphate liquors and heated in a slurried form to continuously evolve ammonia and at the same time crystallize a mixture of mono and di-ammonium phosphate, said crystals being removed in circuit with a centrifuge or other solid-liquid separating equipment, and the liquor recycled or used to reslurry incoming tri-ammonium phosphate. The crystals from the above operation are dried, either directly in a rotary kiln or, preferably, in the manner as heretofore described for drying tri-ammonium phosphate. The dryer product is cooled and stored as a salable product for agricultural, chemical or other uses. Alternatively, any one of the ammonium phosphates heretofore produced may be reacted with solution or slurries of alkaline earth metal compounds and heated to volatilize ammonia therefrom, which is recovered by the aforesaid procedures and the resulting precipitates of phosphates therein produced recovered by direct filtration and/or evaporation and crystallization of the phosphate depending upon which of alkaline earth metal compounds are used. Preferably, however, the ammonium phosphate would be reacted with calcium, sodium or potassium materials to produce their corresponding mono-, di- or tri-ortho, meta or pyro phosphates, or mixtures of any of the aforesaid combinations, said choice depending upon the prevailing economic factors of supply and demand.

Ammonium sulfate crystallized and recovered, as heretofore described, is recycled directly, thermally decomposed into ammonia and ammonium acid sulfate or a mixture of ammonium sulfate and ammonium acid sulfate, reacted in a slurry, with oxygen-containing basic alkaline earth metal compounds, preferably calcium oxide and/or calcium hydroxide, to produce calcium sulfate and volatilize ammonia when said slurry is heated. Ammonium sulfate may also be thermally decomposed in the presence of zinc oxide and the like to recover ammonia and sulfur dioxide gases. Since ammonium sulfate and/or ammonium acid sulfate is required in the primary alum crystallization, preferably a portion of the ammonium sulfate is recycled directly, with or without previous drying, and another portion is thermally decomposed, as in U. S. Patent No. 2,405,747 issued to Arthur W. Hixon, et al., normally in a continuous high temperature, brick lined evaporator where crystalline ammonium sulfate is continuously added to a molten mixture of ammonium acid sulfate and ammonium sulfate, said mixture being of variable composition, but determined normally by the equilibrium existing at the decomposition temperature employed, as shown in the above patent, usually about 300° C., and a portion of the molten material continuously withdrawn and flaked in conventional equipment or cooled and solidified in towers to make pellitized material with an air stream moving concurrently with downcoming molten and/or solid materials. This product may be stored and, with or without the above ammonium sulfate, cycled to alum crystallization in the amount as required to give the crystallizing conditions heretofore described for recovering ammonium alum. Alternatively, the ammonium sulfate-ammonium acid sulfate may be added to the liquor from the leaching circuit to utilize the heat values therein contained in heating up the aforesaid liquor. The remaining ammonium sulfate, or that portion in excess of the quantity required in the recycling operations, is decomposed with materials such as calcium hydroxide to recover ammonia for subsequent recycle, in a manner similar to the operation of a lime leg, and the resulting slurry of calcium sulfate discarded. Alternatively, the ammonium sulfate may be sold as such or thermally decomposed in the presence of zinc oxide, etc., said decomposition used to volatilize ammonia and sulfur dioxide gases, both of which may be cooled and recovered in a conventional manner, the latter in conventional contact sulfuric acid converters and absorption equipment.

Figure 2:
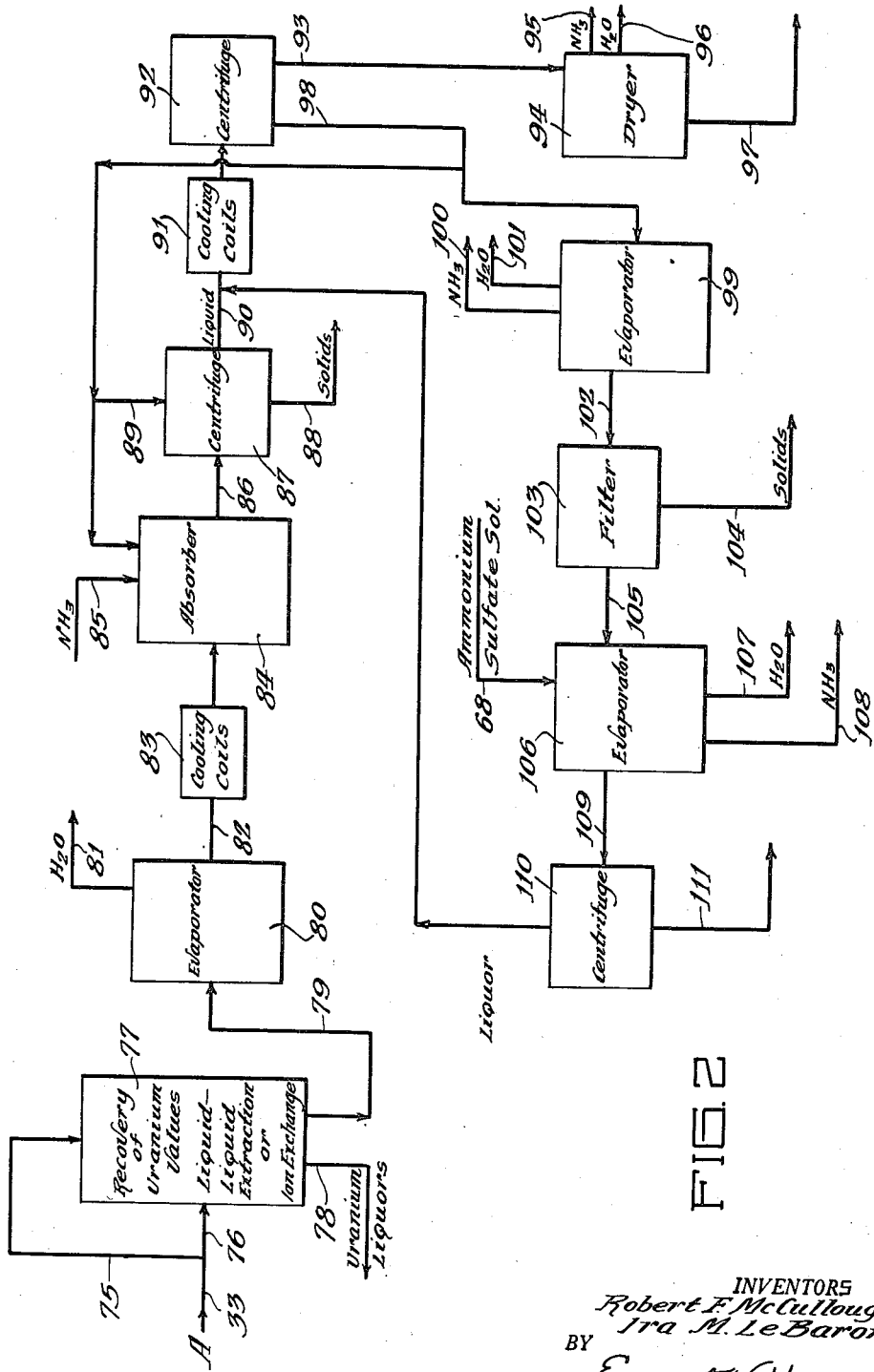

Referring now to the accompanying drawings, Figures 1 and 2 represent diagrammatic flow sheets of the processes outlined in the description. More specifically, these flow sheets disclose the digestion of the minus 200 mesh leached zone material with sulfuric acid and the recovery of aluminum, phosphorus, uranium and iron values from the resultant liquid.

Referring now to Figure 1, the minus 200 mesh leached zone material of from 25 to 65% solids is added through line 2 to mixer tank 3 equipped with agitator 5. To this material in mixer 3, and by means of line 4, sulfuric acid of the required dilution and in the required amount is added to the slurry of leached zone material. The proper temperature and reactions are maintained for the required length of time, all in accordance with the description heretofore set forth and if the third method of contacting sulfuric acid with the leached zone material is employed then the material is passed by means of line 6 into autoclave 7 where the temperature and pressures required for practicing the third method of digestion are utilized. This diagrammatic flow sheet does not show the wet method of processing nor the aging or curing pile method of processing. If the autoclave 7 is employed then the heated reacted material is flushed by passing it through line 8 into cooler 9 equipped with cooling jacket 10.

Material from the sulfuric acid digestion, regardless of which of the three methods is employed, then enters mixer 12 equipped with agitator 14 by means of a line 11 where it is contacted with the first step of a multi-stage countercurrent liquid extraction operation. Recycled liquid through line 25 is used to slurry the digested material in mixer 12. After 2 or 3 minutes in that mixer it is passed by means of line 15 into a filter or other suitable separation of liquid-solid 16 from which the extract produced is removed by means of line 18 for the recovery of the aluminum, uranium, phosphorus and iron values. The filter cake is then passed by means of line 17 into mixer 20 equipped with agitator 21 and to this fresh water is added by means of line 22. After 3 or 4 minutes of agitation in mixer 20 the slurry is conducted by means of line 23 to a filter or other liquid-solid separation device 24 where a filter cake or other solid cake is removed by means of line 26 and discarded and the liquid medium is removed by means of line 25 for return to the initial mixture stage. The diagram shows a two-stage countercurrent extraction. It should be appreciated, however, that any number of stages, 3 or 4 or simply 1 stage of mixing and filtering could be employed, depending upon how well it is desired to extract all of the valuable ingredients from the cake.

By means of line 19 sufficient ammonium sulfate and/or ammonium acid sulfate is contacted and admixed with the extract product in line 18 so as to form alum which is allowed to crystallize as in alum crystallizer 30, the slurry being conducted by means of line 31 into the liquid-solid separation step 32. The filtrate is withdrawn from this step by means of line 33 and forms the raw material for the recovery of uranium, phosphorus, iron and remaining aluminum values as depicted in Figure 2 of the drawing at point A. The cake from the liquid-solid separation step 32 is conducted by means of line 34 to dissolving tank 35 where it is contacted with liquid from a subsequent separation step. The slurry is then conducted by means of line 36 into the crystallization tank 37 and from there by means of line 38 to the liquid-solid separation step 39 where a purified alum is conducted as a cake to an ammonia treatment step by means of line 44. The crystals in step 39 are subjected to a washing operation by the use of wash water introduced by means of line 40. The filtrate from the liquid-solid separation step 39 is recycled by means of line 41 to one of two spots in the system, either it is returned through line 42 to the dissolving tank 35 or it is returned to the liquid-solid separation step 32 where it serves as wash water. This is accomplished by conducting it through line 43 and said wash liquor returned by means of line 33A to alum crystallizer 30. It is at once apparent that the system of crystallizer 30, separation step 32, dissolver 35, crystallization step 37 and separation step 39 constitutes a two-stage crystallization and purification of the alum crystals with recycle of the mother liquor from the purified alum crystals emerging as solids in line 44 from the liquid-solid separation step 39 may be dried and sold in commerce, or they may be treated with a sufficient excess of 20% ammonium hydroxide, introduced through line 45 and allowed to react in reaction vessel 46, which is provided with mild agitation, so that the aluminum sulfate component of the alum is converted into aluminum hydroxide, the slurry being removed from reaction vessel 46 by means of line 47 and subjected to a liquid-solid separation step 48, from which the filtrate 49 is conducted to absorption column evaporator and crystallizer 51 where it is contacted with ammonia introduced at the bottom of the column through line 52. The resultant ammonium sulfate is removed as a solid slurry through line 53 and separated. This material can either be sold in commerce, particularly in the fertilizer industry or it can be used for re-introduction into the system through line 19. Water is removed by line 53A to keep the circuit in balance.

The solids from separation step 48 are conducted by means of line 50 to a slurry mixer 60 and with that there is introduced through line 54 water and through line 64 recycled liquid from a subsequent separation step. After slurrying in mixer 60 the slurry is conducted by means of line 61 to liquid-solid separation step 62 from which the mother liquor is conducted by means of line 63 in one of three ways. It may either go by means of line 65 into column 66 where evaporation takes place and water is driven off by means of line 67 so that ammonium sulfate slurry is removed at the bottom by means of line 68, or it can be returned by means of line 64 to the slurry mixing tanks 60, it joining the solids from separation step 48 in line 55, or it can be used to wash ammonium alum crystals by means of line 64A. As before, the ammonium sulfate in line 68 may be combined with that from line 53 or it may be separately sold to the fertilizer industry or it may be returned for introduction in to the system through line 19. The aluminum hydroxide solids are conducted from separation step 62, either a single or multiple stage extraction unit, by means of line 69 into the dryer 70, which may be a rotary dryer or kiln, and from which water, nitrogen and sulfur values present are removed by means of line 71. This dried, or partially dried, material is then conducted by line 72 into a granulating or rotary calciner 73 from which the dry alumina granules are removed by means of line 74. These alumina granules constitute a product of commercial importance for sale both as an absorption composition and also may be used in various industries employing aluminum.

The liquor from the initial alum crystallization separation step emerging from the system through line 33 appears in the diagram, Figures 1 and 2, as point A. Depending upon whether or not a solvent extraction ion exchange or chemical precipitation operation is employed to recover the uranium values contained in this liquor, the material is conducted into the reaction vessel 77 by means of line 76, or into the top of the reaction vessel 77 by means of line 75. Generally, in the solvent extraction processes and ion exchange processes, an absorption tower-type apparatus or equipment is desired in which case the material would be introduced into the top of reactor 77 by means of line 75. However, in the case of the solvent extraction process the liquor in line 75 would first be partially reduced in accordance with previous descriptions prior to addition to vessel 77. In the case of a chemical precipitation of the uranium, direct introduction into the reaction vessel by means of line 76 is satisfactory. Either a precipitate or a liquid containing the uranium values is removed from reactor 77 by means of line 78 and these particular uranium materials are then further subjected to chemical treatment in accordance with previously discussed processes for the recovery of the uranium as useable commercial compounds.

The liquors from this step, which are substantially free of uranium values and which have been substantially reduced as to their aluminum values, are conducted by means of line 79 into evaporator 80. Water is removed by means of line 81, and the concentrated liquors are conducted by means of line 82 through cooling coils 83 into an absorber 84. Sufficient $NH_3$ is added to these concentrated liquors in the absorber by means of line 85 to bring the pH of the solution to 11. The material is then conducted by means of line 86 to a solid-liquid separation operation, preferably a centrifuge 87, from which a solid crude cake of aluminum-iron-uranium-phosphate is removed by means of line 88, having previously been washed with a portion of the liquor from line 89 in a single or multiple countercurrent extraction unit 87. The liquors from this step are conducted by means of line 90 through cooling coils 91 which further cool them and then into a solid-liquid separation step 92, preferably a centrifuge, where a solid cake of $(NH_4)_3PO_4$ is removed by means of line 93 and conducted to dryer 94. Here water and ammonia are removed by means of lines 95 and 96 respectively, and solid, dry crystals of ammonium phosphate are removed by means of line 97. A portion of the liquors from the solid-liquid separation step 92 are conducted by means of line 98 to an evaporator 99 where water and ammonia are removed by means of lines 100 and 101, respectively. The resultant slurry, containing some solids, is conducted by means of line 102 to a solid-liquid separation step 103, preferably a filter, where the solid cake comprising a crude aluminum phosphate is removed from the system by means of line 104. The liquor from this solid-liquid separation step 103 is conducted by means of line 105 to an evaporator 106. Ammonium sulfate solution is also fed in by means of line 68 (Fig. 1), if desired. Water and ammonia are removed by means of lines 107 and 108. The slurry is conducted by means of line 109 to a solid-liquid separation step 110, preferably a centrifuge, where solid phase ammonium sulfate is removed by means of line 111. The liquors from this step are recycled back into the system by means of line 112.

*Example*

A representative leached zone feed assaying 15.2% $P_2O_5$, 23.21% $Al_2O_3$, 2.68% $Fe_2O_3$, 9.1% CaO, as a 34.4% solids slurry in water, is mixed with 98% sulfuric acid at 1.56 pounds dry solids per pound of acid and autoclaved at 200 pounds per square inch at a temperature of about 388° F. for 1 hour. The resulting mass was cooled and leached countercurrently with water to recover solubilized constituents and the insoluble cake discarded. 1.6 pounds of water per pound of dry leached zone feed was used in the countercurrent extraction of the solubilized values from the digestion. An average filtration rate throughout the countercurrent leaching operation of 7 pounds of dry solids per square foot per hour was obtained. The resultant extract at 1.3 specific gravity assayed 4.72% $P_2O_5$, 6.57% $Al_2O_3$, 0.76% $Fe_2O_3$, 0.0089% $U_3O_8$ and 15.87% sulfate. Overall recoveries in the digesting and leaching circuits were 89% $P_2O_5$, 81% $Al_2O_3$, 81% $Fe_2O_3$ and 86% $U_3O_8$. Add to this extract at 60° C., 0.137 pound ammonium acid sulfate and 0.0818 pound ammonium sulfate per pound of extract and cool to 0° C. to crystallize a material substantially as ammonium aluminum alum. These crystals assay, on a dry basis, 10.5% $Al_2O_3$, 38.4% sulfate, 3.99% ammonia, 44.8% chemical water, 0.3% $P_2O_5$ and 0.1% $Fe_2O_3$. About 57.8 pounds of wet crystals, 5% moisture are recovered per 6.57 pounds of $Al_2O_3$ in the liquor from the leached mineral digest. The overall recovery of $Al_2O_3$ obtained after recrystallization and washing in the subsequent steps to be described is 87%. The extract, after ammonium alum removal, assayed 8.61% $P_2O_5$, 14.41% $SO_4$, 3.07% $NH_3$, 1.44% $F_2O_3$ and 0.91% $Al_2O_3$.

The wet crystals of ammonium alum from the primary crystallization, 57.8 pounds, are redissolved with 180 pounds of a 20% ammonium sulfate solution at 70° C. and slowly cooled at a rate of about 1° per hour until room temperature or 25° C. is reached. Throughout this crystallization very gentle agitation is used. The crystallized and purified ammonium alum is then filtered and the solids therefrom again redissolved and recrystallized as above. It is to be understood, however, that although the above primary crystallization and recrystallizations were conducted on a co-current basis, similar results are obtainable whereby the redissolving liquor of fresh 20% ammonium sulfate is added in the second recrystallization and the liquor therefrom introduced to the first recrystallization. The liquor from the first recrystallization is then introduced to the primary crystallization after evaporation and removal of about 70% of the ammonium sulfate therein contained. In other words, the operation described would be countercurrent rather than the co-current system shown in the example. It is also to be understood that the 20% ammonium sulfate solution may be other than fresh ammonium sulfate, for example as is obtainable from the alumina circuit hereinafter to be described, or even water. Impurities in the ammonium alum from the above crystallizing operations were as follows:

| Crystallization | Percent $P_2O_5$ | Percent iron |
|---|---|---|
| Primary crystallization | 0.30 | 0.1 |
| 1st recrystallization | .005 | 0.002 |
| 2nd recrystallization | 0.00015 | 0.0001 |

The wet crystals of ammonium alum are treated with 2.0 times the theoretical amount of 20% ammonium hydroxide to combine with all of the aluminum sulfate component of the ammonium alum to make ammonium sulfate and reacted with gentle agitation for 2 hours at room temperature. Rapidly filtering hydrated alumina is separated from the reaction mass, preferably in a countercurrent leaching circuit, wherein approximately 180 pounds of water is used to extract the ammonium sulfate. The hydrated alumina assays, after washing, 15.0% $Al_2O_3$, 74% $H_2O$, 85% loss on ignition, 3% sulfate and 1% $NH_3$. This is calcined at 1000° C. to give a production which is largely +100 mesh and assays 99.9% $Al_2O_3$, 0.0017% $P_2O_5$ and 0.001% $Fe_2O_3$ and is suitable for the efficient production of aluminum metal.

The solution from the primary crystallization, or after alum removal, having a volume of 8.82 gallons, is subjected to contact with about 0.44 pound of powdered metallic iron and agitated for about 30 minutes after which the solids were filtered from the liquid, this solution reduction apparently reduces the uranium present to the quadrivalent state. This liquid is then intimately contacted with 0.88 gallon of an organic solvent composed of 9 parts by volume of kerosene and 1 part by volume of a mixture of mono and di esters of ortho and pyro phosphoric acids of iso octyl alcohol, in a 5 stage countercurrent liquid-liquid extraction system. The intimate contact was maintained for 1 to 2 minutes in each of the successive stages and the organic solvent, or extractant, was separated from the last aqueous phase. This aqueous phase was then processed to recover the $P_2O_5$ and other contained values.

The uranium-containing organic solvent was treated with about 0.88 gallon of 50% aqueous hydrofluoric acid with agitation. The aqueous phase containing the uranium precipitate was removed and the uranium tetrafluoride filtered from solution. About 0.02178 pound of uranium tetrafluoride cake of 45% U content is recovered from 100 pounds of solution. The aqueous HF filtrate is recycled to the precipitation step after first introducing additional gaseous hydrofluoric acid into it to restore its strength, to 50% hydrofluoric acid.

The organic solvent phase separated from the aqueous hydrofluoric acid slurry is trated with about 0.0785 pound $P_2O_5$ and washed with about 0.88 gallon of 60% aqueous ortho phosphoric acid. After separating the aqueous phase for recycle to the phosphoric acid treatment step the organic solvent is returned to the beginning of the solvent extraction operation for reuse in the system.

Although it is preferred to substantially reduce the valence state of the uranium from six to four before treating with the selective organic solvent, it is satisfactory to extract efficiently, as before stated, with the uranium in the hexavalent state if more stages of extraction are always employed. The organic solvent extraction may also be carried out using a single stage, especially if the uranium is reduced to the quadrivalent state. However, the percent of extraction will be slightly lower than the 98% shown in the foregoing example.

Aqueous phase from the uranium extracting operation is then adjusted to a pH of 7 and filtered. 18.2 pounds of 28% ammonium hydroxide is required per 100 pounds of liquor from uranium recovery. The filtered solids are washed completely with water and the precipitated material assays 14.9% $Al_2O_3$, 24.6% $Fe_2O_3$ and 42.1% $P_2O_5$, on a dry basis. The resulting liquor is evaporated to .6 of its original volume and neutralized with ammonium hydroxide to a pH of 11.0 while maintaining a temperature of about 60° C. in a pressurized system. This liquid and accompanying very small amount of precipitated values is then cooled to 25° C. and 80% of the contained phosphatic values precipitated as tri ammonium phosphate. This solid is removed by centrifuging and dried at 150° C. to volatilize ammonia and produce a product assaying 22.3% $NH_3$ and 56.3% total $P_2O_5$, and 55.5% water soluble $P_2O_5$ substantially as a mixture of mono- and di-ammonium phosphate.

Liquor from the removal of the tri ammonium phosphate is then evaporated to recover the contained free ammonia and to crystallize 80% of the ammonium sulfate therein contained. Preferably, this evaporation and removal of the crystallized ammonium sulfate therefrom is carried out at 80° C. After removal of the ammonium sulfate, the mother liquor containing $P_2O_5$ is cycled to the liquor after pH 7 adjustment, as heretofore described, for 100% $P_2O_5$ and ammonium sulfate recovery when equilibrium is attained. Ammonium sulfate produced is of high chemical purity.

We claim:

1. A process for recovering mineral values from leached zone material from the Florida pebble phosphate overburden which comprises reacting leached zone material of a particle size smaller than about 150 mesh with sulfuric acid, separating insoluble material from the reaction product soluble in aqueous medium, treating the aqueous medium comprised of solution having an $Al_2O_3$ to $SO_4$ mole ratio of about 1 to 4 with an amount of sulfate of ammonia sufficient to produce in the solution a $(NH_4)_2SO_4$ to $Al_2O_3$ mole ratio in the range between about 1:1 and about 3:1 separating the alum crystals formed from the aqueous medium, and separately recovering from the aqueous medium at least one of the values selected from the group consisting of phosphorous and uranium.

2. A process for recovering mineral values from leached zone material from the Florida pebble phosphate overburden which comprises reacting leached zone material of a particle size smaller than about 150 mesh with sulfuric acid, mixing an aqueous medium with the acid digested material, separating insoluble material from the liquid, treating the liquid with an amount of a sulfate of ammonia sufficient to crystallize a major portion of the aluminum as ammonium alum, removing ammonium alum crystals from the reacted mixture, recrystallizing the ammonium alum to remove a purified product, subjecting the resulting liquid to the action of an organic solvent having affinity for uranium values contained therein and removing the uranium values from the solvent extract.

3. A process for recovering mineral values from leached zone material from the Florida pebble phosphate overburden which comprises reacting leached zone material of a particle size smaller than about 150 mesh with sulfuric acid, mixing aqueous medium with the acid digest, separating insoluble material from the solution, treating the liquid with an amount of a sulfate of ammonia sufficient to crystallize a major portion of the aluminum as ammonium alum, removing ammonium alum crystals from the reacted mixture, solvent extracting the resultant liquid with an alkylphosphoric acid ester, and recovering the uranium values from the rich alkylphosphoric acid ester solution.

4. A process of claim 3 wherein the extraction medium is normal octyl phosphoric acid ester.

5. A process for recovering mineral values from leached zone material from Florida pebble phosphate overburden which comprises reacting leached zone material of a particle size smaller than about 150 mesh with sulfuric acid, mixing aqueous medium with the acid digest, separating insoluble material from the solution, treating the solution with an amount of a sulfate of ammonia sufficient to crystallize a major portion of the aluminum as ammonium alum, removing the alum crystals formed from the solution, solvent extracting the resultant liquid with an alkylphosphoric acid ester, acidifying the uranium-rich ester phase with hydrofluoric acid, heating to drive off hydrofluoric acid, and cooling the resulting liquid to crystallize uranyl sulfate.

6. A process for recovering mineral values from leached zone material from the Florida pebble phosphate overburden which comprises reacting leached zone material of a particle size smaller than about 150 mesh with sulfuric acid, mixing aqueous medium with the acid digest, separating insoluble material from the solution, treating the solution with an amount of a sulfate of ammonia sufficient to crystallize a major portion of the aluminum as ammonium alum, removing the ammonia alum crystals formed from the solution, subjecting the solution to the action of a reducing agent, solvent extracting the resultant liquid with an alkylphosphoric acid ester, and recovering the uranium values dissolved in the phosphoric acid ester.

7. A process for recovering mineral values from leached zone material from the Florida pebble phosphate overburden which comprises reaching leached zone material of a particle size smaller than about 150 mesh with sulfuric acid, mixing aqueous medium with the acid digest, separating insoluble material from the solution, treating the leached solution with an amount of a sulfate of ammonia sufficient to crystallize a major portion of the aluminum as ammonium alum to produce an alum precipitate, separating the alum crystals formed from the solution to produce a solids-free filtrate, adjusting the pH of the filtrate to between 2.5 and about 11 to precipitate phosphate values, and separately recovering the aluminum, iron and uranium values from these precipitates.

8. A process for recovering mineral values from leached zone material from the Florida pebble phosphate overburden which comprises reacting leached zone material of a particle size smaller than about 150 mesh with sulfuric acid, mixing aqueous medium with the acid digest, separating insoluble material from the solution, treating the leached solution with an amount of a sulfate of ammonia sufficient to crystallize a major portion of the aluminum as ammonium alum, separating the alum crystals formed from the leached solution, solvent extracting the resultant liquid with an alkyl-phosphoric acid ester, adjusting the pH of the solvent extracted resultant liquid to about 3.5 for precipitation of aluminum values, removing the precipitate from the solution to produce a solids-free filtrate, adjusting the pH of the filtrate further to about 7 for precipitation of the iron values, and recovering the iron values from the solution.

9. A process for recovering mineral values from leached zone material from the Florida pebble phosphate overburden which comprises reacting leached zone material of a particle size smaller than about 150 mesh with sulfuric acid, mixing aqueous medium with the acid digest, separating insoluble materials from the solution, treating the leached solution with an amount of a sulfate of ammonia sufficient to crystallize a major portion of the aluminum as ammonium alum, separating the alum crystals formed from the resultant solution, solvent extracting the resultant liquid with an alkylphosphoric acid ester, adjusting the pH of the aqueous resultant liquid to a pH between about 9 and about 11.5 to preciptate the iron values, separating the iron value precipitate to produce a solids-free filtrate, concentrating the filtrate while adding ammonia to maintain the pH above about 5.5, cooling the concentrate and recovering the ammonium phosphates which crystallize from solution.

10. The process according to claim 1 wherein the solution obtained following removal of the ammonium alum crystals is subjected to ion exchange for the recovery of the uranium values therein.

11. A process for recovering mineral values from leached zone material from the Florida pebble phosphate overburden which comprises reaching leached zone material with sulfuric acid of 98% concentration in the ratio of 1.56 pounds of solids per pound of acid at a temperature of about 388° F. for about 1 hour under a superatmospheric pressure of about 200 pounds per square inch, leaching the acid digest with water to recover solubilized constituents, separating the insoluble constituents from the solution, adding to the extract when cooled to about 60° C. 0.137 pound of ammonium acid sulfate and 0.0818 pound of ammonium sulfate per pound of extract, cooling the extract to about 0° C. to crystallize ammonium alum, separating the alum crystals, with a 20% ammonium sulfate solution at about 70° C., cooling the solution slowly to about 25° C., filtering off the purified aluminum alum crystals returning the filtrate for mixing with solutions in the primary crystallization after removal of ammonium sulfate, treating the solution obtained from the ammonium alum removal step with powdered metallic iron in the ratio of about 20 gallons of solution per pound of iron, contacting the treating solution countercurrently with an organic solvent composed of 9 parts kerosene and 1 part of a mixture of mono- and di-ester of octyl phosphoric acid ester, separating the aqueous and the organic phases, treating the organic phase with 50% aqueous hydrofluoric acid, separating the uranium tetrafluoride, adjusting the pH of the aqueous phase to about pH 7 with 28% ammonium hydroxide, filtering off the precipitated solids, consisting predominately of aluminum and iron compounds, evaporating the filtrate to about six tenths of its volume, adjusting the pH of the concentrate to about 11 with ammonium hydroxide, cooling the solution to about 25° C. to precipitate ammonium phosphate, separating the ammonium phosphates from the solution, and concentrating the solution to recover approximately 80% of the ammonium sulfate therein.

12. A process for recovering mineral values from leached zone material from the Florida pebble phosphate overburden which comprises reacting leached zone material with aqueous sulfuric acid solution, separating insoluble material from aqueous solution of reaction products, treating the aqueous solution with an amount of sulfate of ammonia sufficient to crystallize a major portion of the aluminum as ammonium alum, separating the alum crystals from the aqueous medium, and separately recovering from the resultant aqueous solution uranium and phosphorus values.

13. A process for recovering mineral values from leached zone material from the Florida pebble phosphate overburden which comprises reacting leached zone material of a particle size smaller than about 150 mesh with sulfuric acid of a concentration between about 20% and about 55% sulfuric acid in an amount of between about 55% and about 105% of the amount required to react with all of the constituents capable of reacting with sulfuric acid, separating insoluble material from aqueous solution of reaction products, treating the aqueous solution with an amount of sulfate of ammonia sufficient to crystallize a major portion of the aluminum as ammonium alum, separating the alum crystals from the aqueous medium and separately recovering from the resultant aqueous solution uranium and phosphorus values.

References Cited in the file of this patent

UNITED STATES PATENTS

| Number | Name | Date |
| --- | --- | --- |
| 890,584 | Fleck et al. | June 9, 1908 |
| 1,070,313 | Adams | Aug. 12, 1913 |
| 1,437,191 | Paul | Nov. 28, 1922 |
| 1,162,130 | Buchner | Nov. 30, 1915 |
| 2,013,970 | Moore | Sept. 10, 1935 |

FOREIGN PATENTS

| Number | Country | Date |
| --- | --- | --- |
| 437,833 | Great Britain | Nov. 6, 1935 |

OTHER REFERENCES

Warf: U. S. Atomic Energy Commission Declassified Document No. 2524, decl. March 11, 1949, 10 pages. (Copy in Scientific Library.)

Wright: Atomic Energy Commission declassified document No. Y-884, 20 pages (May 7, 1952). (Copy in Scientific Library.)